US012153128B2

United States Patent
Cheon

(10) Patent No.: US 12,153,128 B2
(45) Date of Patent: Nov. 26, 2024

(54) APPARATUS AND METHOD FOR VEHICLE CONTROL IN THE PRESENCE OF TEMPORARILY OBSCURED MOVING OBSTACLES

(71) Applicant: HL Klemove Corp., Pyeongtaek-si (KR)

(72) Inventor: Seung Hun Cheon, Seongham-si (KR)

(73) Assignee: HL KLEMOVE CORP., Incheon (KR)

(*) Notice: Subject to any disclaimer, the term of this patent is extended or adjusted under 35 U.S.C. 154(b) by 357 days.

(21) Appl. No.: 17/570,572

(22) Filed: Jan. 7, 2022

(65) Prior Publication Data
US 2022/0126819 A1    Apr. 28, 2022

Related U.S. Application Data

(63) Continuation of application No. PCT/KR2020/011297, filed on Aug. 25, 2020.

(30) Foreign Application Priority Data

Sep. 9, 2019    (KR) .......................... 10-2019-0111200

(51) Int. Cl.
*B60W 30/09*     (2012.01)
*B60W 30/095*    (2012.01)
(Continued)

(52) U.S. Cl.
CPC ........... *G01S 13/931* (2013.01); *B60W 30/09* (2013.01); *B60W 30/0956* (2013.01);
(Continued)

(58) Field of Classification Search
CPC ........... G01S 13/931; G01S 2013/9322; G01S 2013/93185; G01S 2013/932;
(Continued)

(56) References Cited

U.S. PATENT DOCUMENTS

| | | | |
|---|---|---|---|
| 5,483,242 A * | 1/1996 | Grein | G01S 13/345 342/111 |
| 2005/0021201 A1 * | 1/2005 | Klotz | B60W 30/16 702/189 |

(Continued)

FOREIGN PATENT DOCUMENTS

| | | |
|---|---|---|
| CN | 103135105 A | 6/2013 |
| CN | 105620489 A | 6/2016 |

(Continued)

OTHER PUBLICATIONS

First Office Action issued on Sep. 29, 2023 for counterpart Chinese Patent Application No. 202080062991.X.

*Primary Examiner* — Daniel M. Robert
(74) *Attorney, Agent, or Firm* — Harvest IP Law, LLP

(57) ABSTRACT

The present invention relates to an apparatus and method of controlling a vehicle. The present disclosure relates to a vehicle control apparatus and a control method therefor. Particularly, the vehicle control apparatus according to the present disclosure comprises: an operation performance unit for recognizing a first moving target on the basis of detection information detected by a sensor and performing a collision avoidance control operation; an identity determination unit for, when the first moving target is not recognized, recognizing a second moving target on the basis of the detection information after the first moving target is not recognized and determining whether or not the first moving target and the second moving target are identical to each other; and a control unit for, when the identity between the first moving target and the second moving target is recognized, controlling the vehicle on the basis of the collision avoidance control operation.

18 Claims, 14 Drawing Sheets

(51) Int. Cl.
*B60W 40/105* (2012.01)
*G01S 13/931* (2020.01)

(52) U.S. Cl.
CPC ..... *B60W 40/105* (2013.01); *B60W 2420/408* (2024.01); *B60W 2554/80* (2020.02); *G01S 2013/9322* (2020.01)

(58) Field of Classification Search
CPC ........... G01S 13/865; G01S 2013/9323; G01S 2013/93271; G01S 7/415; G01S 13/58; G01S 13/86; G01S 13/867; G01S 2013/9318; G01S 2013/9321; B60W 30/09; B60W 30/0956; B60W 40/105; B60W 2420/408; B60W 2554/80; B60W 2554/4029; B60W 2554/4042; B60W 2554/4044; B60W 30/0953; B60W 40/02; B60W 50/14; B60W 2050/143; B60W 2552/50; B60W 30/08; B60W 2420/403; B60W 2420/54; B60W 2520/06; G06F 18/00; G60V 10/26

See application file for complete search history.

(56) References Cited

U.S. PATENT DOCUMENTS

| | | |
|---|---|---|
| 2017/0291602 A1* | 10/2017 | Newman ............... B60W 10/18 |
| 2017/0369051 A1 | 12/2017 | Sakai et al. |
| 2019/0061750 A1* | 2/2019 | Tamura ............. B60W 30/0956 |
| 2019/0073907 A1* | 3/2019 | Takaki ............. B60W 30/0956 |
| 2019/0193727 A1* | 6/2019 | Noda ..................... G08G 1/167 |
| 2020/0278681 A1* | 9/2020 | Gier ....................... G06V 20/56 |

FOREIGN PATENT DOCUMENTS

| | | | |
|---|---|---|---|
| CN | 106030336 A | | 10/2016 |
| CN | 108162760 A | | 6/2018 |
| CN | 110182204 A | | 8/2019 |
| JP | 2011145204 A | * | 7/2011 |
| JP | 2012-8718 A | | 1/2012 |
| JP | 2012-247829 A | | 12/2012 |
| KR | 10-2017-0108239 A | | 9/2017 |

\* cited by examiner

APPARATUS AND METHOD FOR VEHICLE CONTROL IN THE PRESENCE OF TEMPORARILY OBSCURED MOVING OBSTACLES

CROSS-REFERENCE TO RELATED APPLICATION

If applicable, this application is a Bypass Continuation Application of International Patent Application No. PCT/KR2020/011297, filed on Aug. 25, 2020, which claims priority benefit under 35 U.S.C § 119 (a) of Patent Application No. 10-2019-0111200, filed on Sep. 9, 2019, in the Republic of Korea, the entire contents of which are incorporated herein by reference. In addition, this non-provisional application claims priorities in countries other than the U.S. for the same reason based on the Korean Patent Application, the entire contents of which are hereby incorporated by reference.

TECHNICAL FIELD

The present invention relates to an apparatus and method of controlling a vehicle.

BACKGROUND ART

In a conventional vehicle collision avoidance technology, a braking control has been performed to avoid collision with an obstacle such as a vehicle or a person located in front of the vehicle. Specifically, the conventional vehicle collision avoidance technology calculates the probability of a potential collision with the obstacle through a radar, a camera, and the like, compares a current distance with a distance to the obstacle required to avoid the collision, warns a corresponding driver in a situation where a sufficient distance is not maintained, and in case the driver does not show an appropriate response, automatically generates, or assists, a braking force through a braking control system.

However, in the case of a moving obstacle, the moving obstacle may be temporarily obscured by another obstacle such as a stationary object. In this situation, since the vehicle collision avoidance technology is newly reinitiated from the moment the moving obstacle reappears, and has a disadvantage of causing a braking time to be delayed.

Accordingly, it is desired to provide a technology capable of controlling a vehicle at an appropriate braking time even when a moving obstacle reappears after being covered.

DETAILED DESCRIPTION OF THE INVENTION

Technical Problem

To address this issue, embodiments of the present disclosure provide apparatuses and methods of controlling a vehicle for rapidly controlling the vehicle at an appropriate braking time even when a moving target such as a pedestrian, another vehicle, and the like reappears after being covered.

Further, embodiments of the present disclosure provide apparatuses and methods of controlling a vehicle for assisting stable driving and convenient driving by minimizing confusion that a driver may experience in a situation where a collision may occur.

Technical Solution

According to one aspect of the present disclosure, a vehicle control apparatus is provided that includes: a computing circuitry capable of recognizing a first moving target based on detection information detected by at least one sensor and performing a collision avoidance control computation based on the probability of a potential collision between the first moving target and an associated vehicle; an identity determiner, when the first moving target is not recognized, capable of recognizing a second moving target based on the detection information acquired after the first moving target is not recognized, and determining whether the first moving target and the second moving target are identical to each other; and a controller capable of controlling the vehicle based on the collision avoidance control computation when it is acknowledged that the first moving target and the second moving target are identical.

According to another aspect of the present disclosure, a vehicle control method is provided that includes: a computation step of recognizing a first moving target based on detection information detected by at least one sensor and performing a collision avoidance control computation based on the probability of a potential collision between the first moving target and an associated vehicle; an identity determination step, when the first moving target is not recognized, of recognizing a second moving target based on the detection information acquired after the first moving target is not recognized, and determining whether the first moving target and the second moving target are identical to each other; and a control step of controlling the vehicle based on the collision avoidance control computation when it is acknowledged that the first moving target and the second moving target are identical.

Effects of the Invention

According to the embodiments described herein, it is possible to provide apparatuses and methods of controlling a vehicle for rapidly controlling the vehicle at an appropriate braking time even when a moving target such as a pedestrian, another vehicle, and the like reappears after being covered.

Further, according to the embodiments described herein, it is possible to provide apparatuses and methods of controlling a vehicle for assisting stable driving and convenient driving by minimizing confusion that a driver may experience in a situation where a collision may occur.

BEST MODE FOR CARRYING OUT THE INVENTION

Hereinafter, embodiments of the present disclosure will be described in detail with reference to the accompanying drawings. such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element is "connected" or "coupled" to another element, it should be interpreted that another element may be "interposed" between the elements or the elements may be "connected" or "coupled" to each other via another element as well as that one element is directly connected or coupled to another element.

Figure 1:
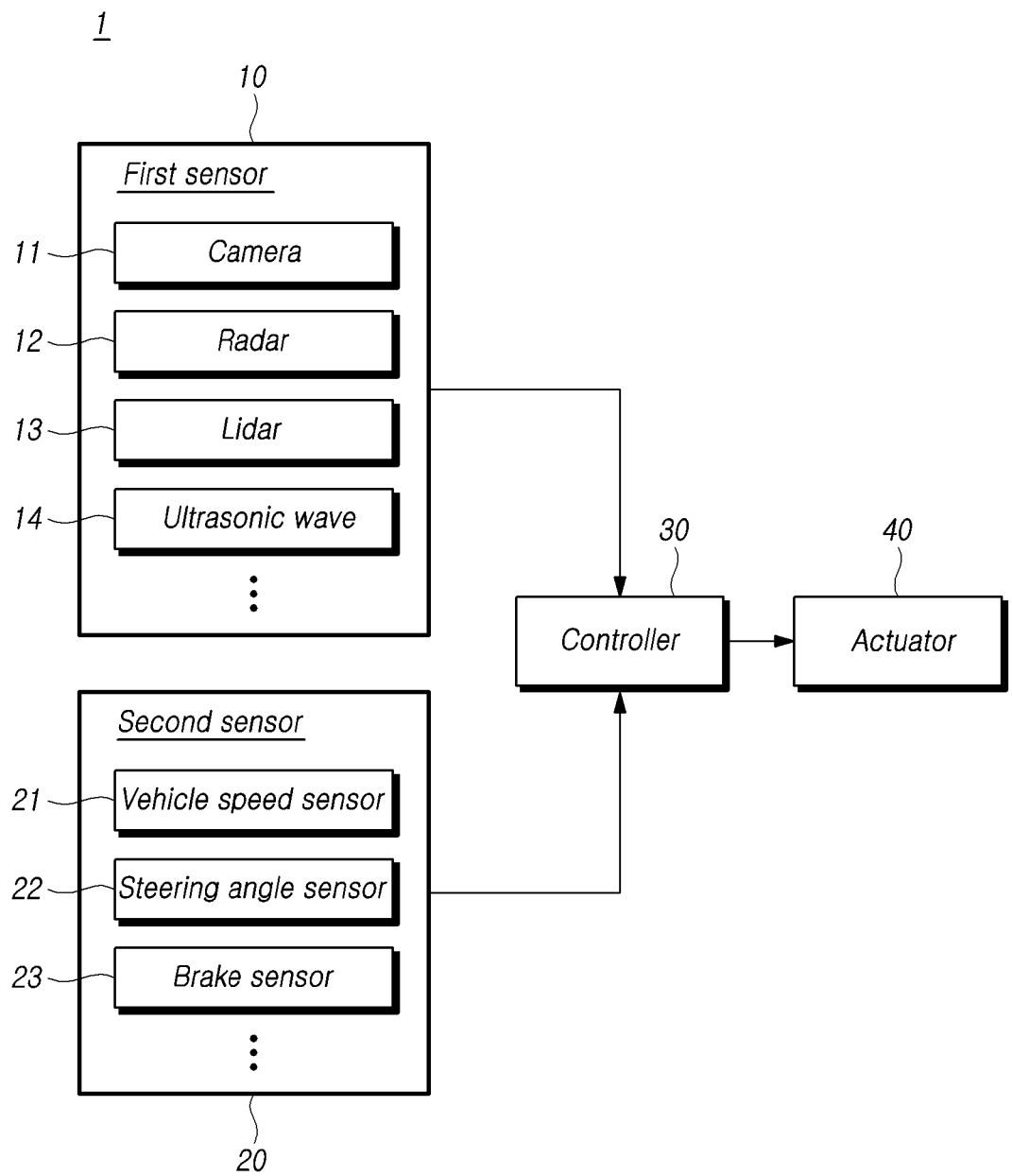
FIG. 1 is a block diagram illustrating a vehicle control system according to aspects of the present disclosure.

FIG. 1 is a block diagram illustrating a vehicle control system 1 according to aspects of the present disclosure.

Referring to FIG. 1, the vehicle control system 1 according to aspects of the present disclosure may include a first sensor 10, a second sensor 20, a controller 30, an actuator 40, and the like.

The first sensor 10 may be mounted on an associated vehicle, for example at a location where the first sensor 10 has a view of the outside of the vehicle, and can acquire detection information. Here, the view of the outside of the vehicle may refer to a detection area or range for detecting conditions outside of the vehicle.

The first sensor 10 may include one or more first sensors, and in this case, at least one first sensor 10 may be mounted on respective portions of the vehicle in which a forward view, at least one sideward view, and/or a backward view from the vehicle are provided.

The first sensor 10 may include an image sensor for acquiring image data, a non-image sensor for acquiring non-image data, and the like. For example, as the image sensor, the first sensor 10 may include a camera 11, a radar 12, a lidar 13, an ultrasonic sensor (hereinafter referred to as an ultrasonic wave 14), and the like.

Here, image information acquired by the capturing of the image sensor contains image data, and thus, may mean image data acquired by the capturing of the image sensor. Herein, image information acquired by the capturing of the image sensor may mean image data acquired by the capturing of the image sensor.

The image data acquired by the capturing of the image sensor may be generated, for example, in one format of AVI, MPEG-4, H.264, DivX, and JPEG. The image data acquired by the capturing of the first sensor 10 can be processed by a controller 130, such as a processor.

The image sensor may be an image sensor having a relatively wider angle of view and relatively higher resolution. For example, the angle of view of the image sensor may be about 100°, and the resolution may be about 10 μm. However, embodiments of the present disclosure are not limited thereto. For example, the image sensor employed in embodiments of the present disclosure may refer to a sensor having the widest angle of view among sensors that can be implemented.

The non-image sensor may be mounted on the vehicle, for example, at a location where the non-image sensor has a detection area or range for detecting conditions outside of the vehicle, and thus, can acquire detection information.

The non-image sensor may be a non-image sensor having a relatively large number of channels and a relatively higher angular resolution. For example, the angular resolution of the non-image sensor may be 5°. However, embodiments of the present disclosure are not limited thereto. For example, the non-image sensor employed in embodiments of the present disclosure may refer to a sensor having the highest angular resolution among sensors that can be implemented.

The second sensor 20 may refer to a sensor for detecting information inside of the vehicle. For example, the second sensor 20 may include a vehicle speed sensor 21 for detecting a vehicle speed, a steering angle sensor 22 for detecting a steering angle, a brake sensor 23 for detecting a braking force of a vehicle, a torque sensor for detecting a steering torque, a motor position sensor for detecting information on a steering motor, a vehicle motion sensor for detecting a motion of the vehicle, a vehicle attitude sensor, and the like. In addition to this, the second sensor 20 may refer to one or more sensors for acquiring various data inside of the vehicle.

The controller 30 can process data acquired from at least one of the first sensor 10 and the second sensor 20. Specifically, the controller 30 can receive data from each of the first sensor 10 and the second sensor 20 and output a control signal for controlling the vehicle.

For example, the controller 30 can detect and recognize a target using the detection information received from the first sensor 10, and acquire information on physical quantities such as a position, speed, and movement direction etc. of the target. Further, the controller 30 can acquire information on physical quantities such as the speed and position etc. of the vehicle by using the sensing information received from the second sensor 20. Thereafter, the controller 30 can determine the probability of a potential collision between the target and the vehicle using the acquired physical quantity information, and when it is determined that the probability of the potential collision is present, output, to the actuator 40, a control signal for performing a warning control, a vehicle operation (deceleration, braking, avoidance steering, etc.) control, and the like.

Meanwhile, the controller 30 can perform an adaptive driving assistance system (ADAS) function. Here, the ADAS may refer to various types of advanced driver assistance systems, such as an autonomous emergency braking (AEB) system, a smart parking assistance system (SPAS), and a blind spot detection (BSD) system, an adaptive cruise control (ACC) system, a lane departure warning system (LDWS), a lane keeping assist system (LKAS), a lane change assist system (LCAS), and the like. However, embodiments of the present disclosure are not limited thereto.

The controller 30 may be implemented using an electronic control unit (ECU), a micro controller unit (MCU), or the like.

The actuator 40 can be driven according to a control operation of the controller 30. Specifically, if the controller 30 outputs a control signal, the actuator 40 can receive the control signal and perform a control operation indicated by the control signal.

The actuator 40 may be, for example, one or more of a braking actuator for braking the vehicle, a steering actuator for performing avoidance steering of the vehicle, a display for visually displaying a warning message to a driver, a warning actuator for outputting a warning sound, a haptic actuator for tactilely signaling to the driver, and the like. However, embodiments of the present disclosure are not limited thereto.

Hereinafter, a vehicle control apparatus capable of performing all of the functions of the above-described controller 30 will be described in detail.

Figure 2:
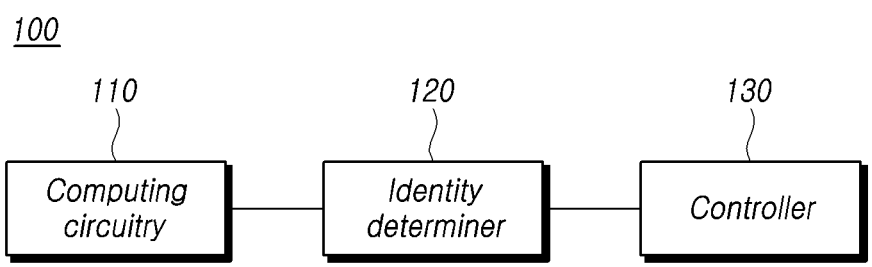
FIG. 2 is a block diagram illustrating a vehicle control apparatus according to aspects of the present disclosure.

FIG. 2 is a block diagram illustrating the vehicle control apparatus 100 according to aspects of the present disclosure.

Referring to FIG. 2, the vehicle control apparatus 100 according to aspects of the present disclosure can recognize a moving target present in the vicinity of a vehicle, perform a collision avoidance control computation, such as a warning control, a deceleration control, a braking control, an avoidance steering control, and the like, based on the probability of a potential collision between the moving target and the vehicle, and control the vehicle depending on the degree of the probability of the potential collision.

Here, the moving target means a target that moves unlike a stationary target that does not move, for example, a pedestrian, a bicycle, or another vehicle.

Here, the collision avoidance control computation may refer to a logic or algorithm for preventing a collision between the vehicle and the target. For example, the collision avoidance control computation may refer to a logic for performing the autonomous emergency braking (AEB). However, embodiments of the present disclosure are not limited thereto.

Meanwhile, in a situation where the moving target is temporarily covered by a stationary target or the like, the first sensor 10 according to embodiments of the present disclosure may not temporarily detect the moving target. In this case, the vehicle control apparatus 100 can recognize the moving target again, determines whether the newly recognized moving target is identical to the previously recognized moving target, control the vehicle using the collision avoidance control computation previously calculated when it is acknowledged that the two moving targets are identical, and control the vehicle by performing a collision avoidance control computation for the newly recognized moving target when it is not acknowledged that the two moving targets are identical The vehicle control apparatus 100 may include a computing circuitry 110, an identity determiner 120, a controller 130, and the like.

The computing circuitry 110 can recognize a first moving target based on detection information acquired by the detection of at least one sensor (e.g., the first sensor 10), and perform a collision avoidance control computation based on the probability of a potential collision between the first moving target and the vehicle.

Here, the collision avoidance control computation may mean a calculation for performing an avoidance control of a vehicle based on a distance between the vehicle and a target, and as described above, for example, mean a logic for performing the autonomous emergency braking (AEB). However, embodiments of the present disclosure are not limited thereto.

Here, the computing circuitry 110 can perform a collision avoidance control computation for differently determining at least one of a warning level and a braking level depending on the degree of the probability of a potential collision. A detailed description on this will be described below with reference to FIG. 6.

In a situation where the first moving target is unrecognized, the identity determiner 120 can recognize a second moving target based on detection information acquired after the first moving target is unrecognized, and determine whether the first moving target and the second moving target are identical to each other.

Here, a method of determining whether the first moving target and the second moving target are identical to each other may refer to a method of determining using the similarity of characteristics of the moving target, and the characteristics of the moving target may be, for example, a quantity of reflected radar signals (dbsm, reflection area or range, RCS, etc.) from the moving target, a movement speed of the moving target, an appearance, and the like. However, embodiments of the present disclosure are not limited thereto. The method of determining identity between targets will be described below with reference to FIGS. 9 to 11.

Here, the second moving target may mean a moving target newly recognized after a time or period where the first moving target has not been recognized due to the covering of a stationary target. If the first moving target is detected by the first sensor 10 after having been covered, the second moving target and the first moving target may be identical.

In a situation where identity between the first and second moving targets is acknowledged, the controller 130 can control the vehicle based on the collision avoidance control computation. For example, if the first moving target and the second moving target are identical, the controller 130 can apply the collision avoidance control computation calculated using the first moving target to the second moving target as it is, and perform the control of the vehicle with respect to the second moving target.

In a situation where identity between the first and second moving targets is not acknowledged, the controller 130 can output, to the computing circuitry 110, a signal for instructing a collision avoidance control computation to be performed for the second moving target. Meanwhile, in an emergency, the controller 130 can control the vehicle by directly performing such a collision avoidance control computation for the second target.

As described above, the vehicle control apparatus 100 according to aspects of the present disclosure can provide an effect of rapidly controlling the vehicle at an appropriate control time, even if a moving target, such as a pedestrian, is recognized again after having been covered.

Hereinafter, embodiments for recognizing a moving target will be described.

Figure 3:
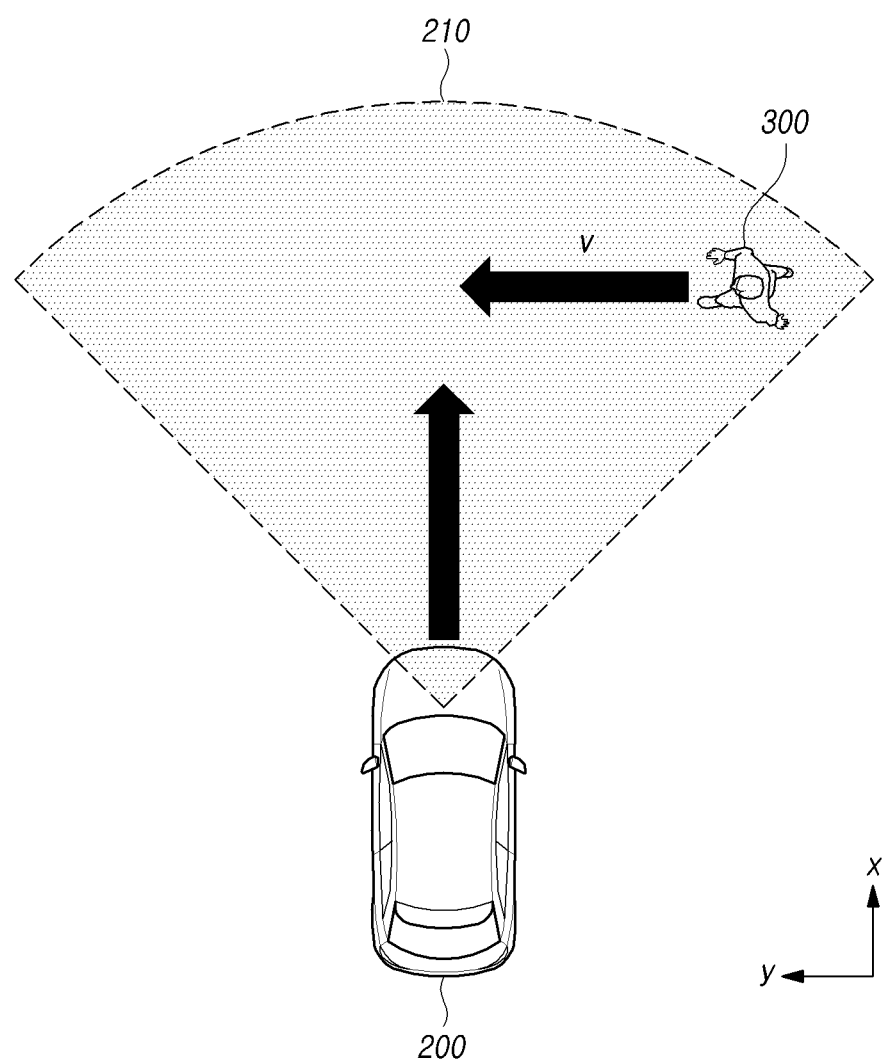
FIG. 3 illustrates embodiments of recognizing a moving target in the vehicle control apparatus and/or the vehicle control system according to aspects of the present disclosure.

FIG. 3 illustrates embodiments of recognizing a moving target in the vehicle control apparatus and/or the vehicle control system according to aspects of the present disclosure.

Referring to FIG. 3, in a situation where a vehicle to which embodiments of the present disclosure are applied is traveling, the first sensor 10 mounted on the vehicle can detect conditions in front of the vehicle within a predetermined detection area or range 210.

In this case, in a situation where a first target 300 present in front of the vehicle, for example, a pedestrian, moves in a direction (e.g., a y direction) orthogonal to a traveling direction (e.g., an x direction) of the vehicle, since there is a probability of a potential collision between the vehicle and the first target 300, the vehicle control apparatus 100 mounted on the vehicle can recognize the first target 300 present in front of the vehicle, i.e., the pedestrian, as a moving target. That is, the vehicle control apparatus 100 can measure a movement speed of the first target 300, for example, a movement speed v in a direction orthogonal to the traveling direction of the vehicle, and recognize the first target 300 as the moving target based on the measured movement speed.

In a specific example, the computing circuitry 110 can measure a movement speed in the direction (e.g., the y direction) orthogonal to the traveling direction (e.g., the x direction) of the vehicle with respect to one or more targets included in detection information. Further, the computing circuitry 110 can recognize a target having a movement speed equal to or greater than a preset reference speed among targets included in the detection information as a first moving target.

Further, the computing circuitry 110 can recognize, as one or more first moving targets, one or more targets moving in a direction in which a distance between the traveling vehicle and the target becomes closer, as well as the target moving in the direction orthogonal to the traveling direction of the vehicle. For example, if an angle between the traveling direction of the vehicle and the moving direction of the target is 60 degrees, this angle is not orthogonal, but there is still the probability of a potential collision between the vehicle and the target. Therefore, the computing circuitry 110 can recognize that target as the first moving target. To do this, the computing circuitry can determine whether or not the target moves in a direction closer to the vehicle through an amount of change in the distance between the vehicle and the target over time.

Here, the movement speed of the target can be measured using detection information acquired by the first sensor 10 such as the radar 12, the lidar 13, the ultrasonic wave 14, and the like. For example, the movement speed can be measured using a propagation speed and required propagation time of a signal output by the first sensor 10 which is the radar 12, and a frequency shift due to the Doppler effect of a received signal reflected from the target.

In one embodiment, the reference speed may be set to 1 m/s (or 3.6 kph); however, embodiments of the present disclosure are not limited thereto.

If a traveling direction of the moving target is not orthogonal to the traveling direction (e.g., the x direction) of the vehicle unlike the traveling direction of the moving target shown in FIG. 3, among a first component (e.g., an x direction component) and a second component (e.g., a y direction component) of the movement speed of the moving target, a component (e.g., the second component) of the direction orthogonal to the traveling direction (e.g., the x direction) of the vehicle can be used for implement a method of recognizing the moving target.

Meanwhile, although a moving target can be recognized by only the movement speed of the target, it may be desired to more accurately select a target having the probability of a potential collision with the vehicle. In this case, the vehicle control apparatus 100 according to aspects of the present disclosure can recognize a moving target by further using a movement distance and a movement time of a vehicle, as well as a movement speed of the vehicle.

Figure 4:
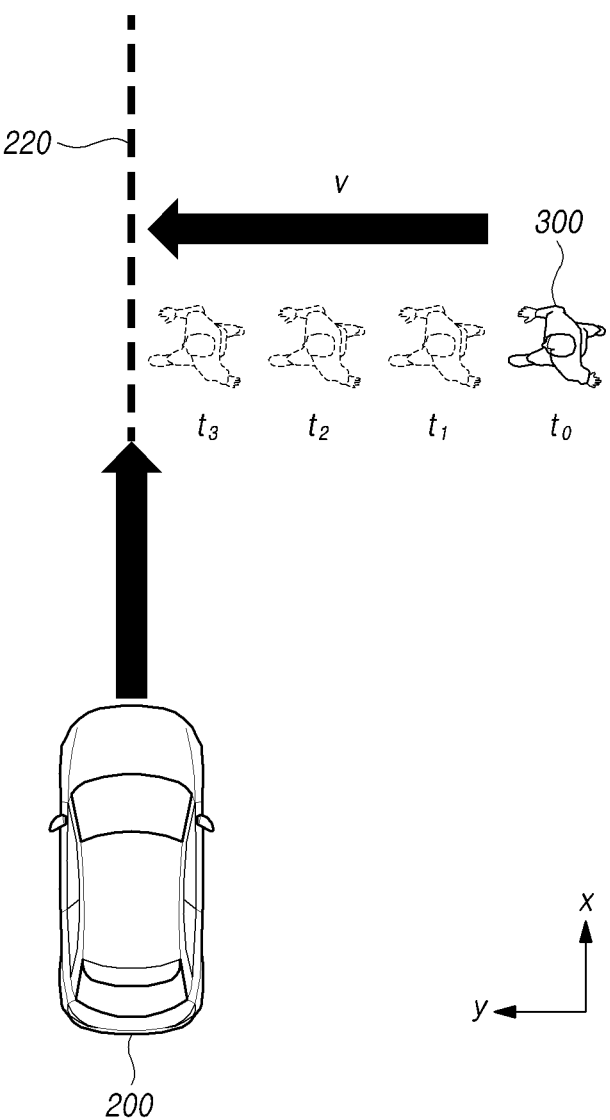
FIG. 4 illustrates embodiments of recognizing a moving target in the vehicle control apparatus and/or the vehicle control system according to aspects of the present disclosure.

FIG. 4 illustrates embodiments for recognizing a moving target in the vehicle control apparatus and/or the vehicle control system according to aspects of the present disclosure.

Referring to FIG. 4, when a vehicle travels, the first sensor 10 mounted on the vehicle can detect conditions in front of the vehicle. In this situation, while a first target 300, for example, a pedestrian moves in a direction (e.g., the y direction) orthogonal to a traveling direction (e.g., the x direction) of the vehicle, the vehicle control apparatus 100 can measure a movement speed (e.g., a movement speed v in the y direction) of the first target 300, i.e., the pedestrian.

Thereafter, while the first target 300, i.e., the pedestrian moves at the movement speed v, the vehicle control apparatus 100 can measure a movement time or period (t0~t3) taken for the movement of the first target 300, i.e., the pedestrian.

Further, if the target is predicted to reach an expected traveling path 220 of the vehicle within a preset reference movement time (e.g., t3), the vehicle control apparatus 100 can recognize the target as a moving target.

For example, the computing circuitry 110 can recognize, as a first moving target, a target that is expected to reach the expected traveling path 220 of the vehicle within the preset reference movement time, among targets moving at a movement speed v that is equal to or greater than a reference speed.

Specifically, the computing circuitry 110 can calculate a predicted movement path of the first target 300 by multiplying a movement speed v (e.g., the movement speed in the y direction) of the first target 300 by the reference time. Then, the computing circuitry 110 can calculate a movement distance by multiplying a current vehicle speed (e.g., the movement speed in the x direction) of the vehicle acquired through the second sensor 20 by the reference time, and calculate an expected traveling path 220 corresponding to the movement distance. Next, when it is determined that the predicted movement path of the first target 300 and the expected traveling path 220 of the vehicle meet at the reference time, the computing circuitry 110 can recognize the first target 300 as a moving target.

Here, the vehicle control apparatus 100 can calculate an offset in a specific direction, for example, a lateral offset, between a position of the target and a current position of the vehicle using the first sensor 10, and if the calculated offset is smaller than or equal to a preset reference distance, can recognize the target as a moving target.

Meanwhile, the vehicle control apparatus 100 can recognize a moving target using a collision prediction time ("time to collision" (TTC)) between the vehicle and the target.

Figure 5:
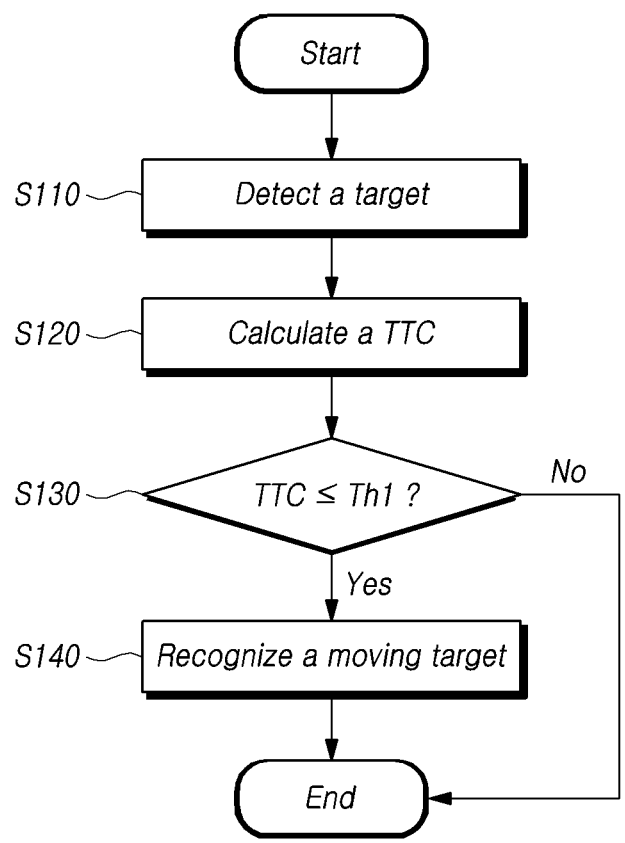
FIG. 5 is a flow chart illustrating embodiments of recognizing a moving target in the vehicle control apparatus and/or the vehicle control system according to aspects of the present disclosure.

FIG. 5 is a flow chart illustrating embodiments of recognizing a moving target in the vehicle control apparatus and/or the vehicle control system according to aspects of the present disclosure.

Referring to FIG. 5, the first sensor 10 according to embodiments of the present disclosure can detect a target present in the vicinity of a vehicle, at step S110, and the vehicle control apparatus 100 according to aspects of the present disclosure can calculate a time to collision (TTC) between the vehicle and the target, at step S120.

For example, the computing circuitry 110 can calculate a time to collision (TTC) between the target and the vehicle included in the detection information.

Thereafter, the vehicle control apparatus 100 can compare the calculated TTC with a preset reference collision time Th1, and determine whether the TTC is equal to or smaller than the reference collision time Th1, at step S130.

If the TTC is greater than the reference collision time Th1, i.e., No at step S130, such a target may be a stationary target (e.g., a structure, etc.) or another moving target without the probability of a potential collision (e.g., another vehicle traveling in the same direction as the traveling direction of the vehicle, etc.). Accordingly, the vehicle control apparatus 100 ends the moving target recognition operation.

When the TTC is equal to or smaller than the reference collision time Th1, i.e., Yes at step S130, the vehicle control apparatus 100 can recognize the target as a moving target, at step S140.

For example, the computing circuitry 110 can recognize, a first moving target, a target having a time to collision equal to or less than a preset reference collision time with respect to the vehicle.

Meanwhile, as shown in FIG. 5, the vehicle control apparatus 100 can recognize a moving target using only the TTC between the vehicle and the target, and also recognize the moving target by using a movement speed, an expected movement path, and the like of the target described above with reference to FIGS. 3 and 4.

As described above, the vehicle control apparatus 100 according to aspects of the present disclosure can provide an effect of preventing an erroneous control by selecting a moving target from among the detected targets.

Meanwhile, a specific implementation of a collision avoidance control computation may be different depending on a probability of a potential collision between a vehicle and a moving target. Hereinafter, embodiments of performing in a collision avoidance control computation will be described.

Figure 6:
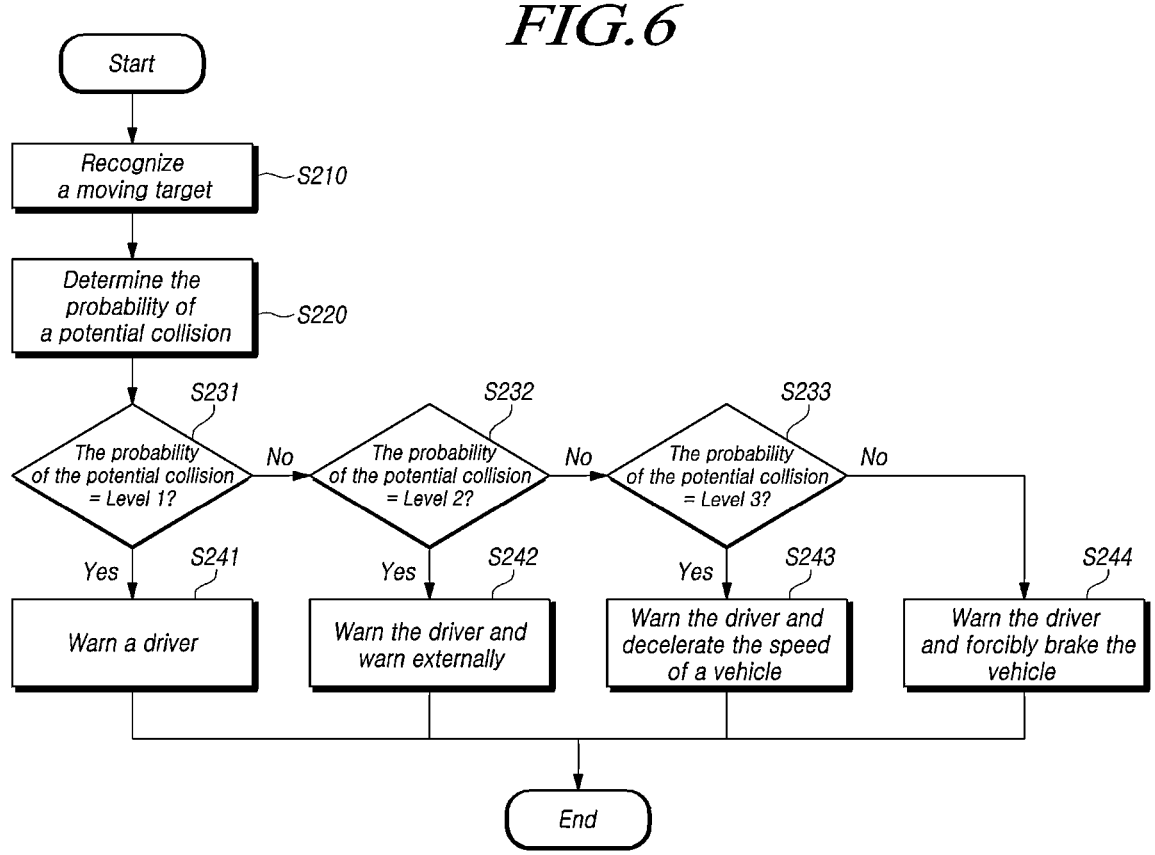
FIG. 6 is a flow chart illustrating embodiments of performing a collision avoidance control computation according to collision probabilities in the vehicle control apparatus and/or the vehicle control system according to aspects of the present disclosure.

FIG. 6 is a flow chart illustrating embodiments of performing a collision avoidance control computation according to collision probabilities in the vehicle control apparatus and/or the vehicle control system according to aspects of the present disclosure.

Referring to FIG. 6, the vehicle control apparatus 100 according to aspects of the present disclosure can recognize a moving target among targets detected by the first sensor 10 as described above with reference to FIGS. 3 to 5, at step S210, and calculate a probability of a potential collision between the vehicle and the moving target, at step S220.

In one embodiment, the probability of the potential collision between the vehicle and the moving target can be performed such that the vehicle control apparatus 100 sets respective modeling for each of the vehicle and the moving target, predicts a position of the vehicle and a position of the moving target on a predetermined time basis, and determine the probability of the potential collision based on whether the vehicle modeling and the moving target modeling meet at a specific time. However, embodiments of the present disclosure are not limited thereto. For example, the vehicle control apparatus 100 can determine the probability of the potential collision by using a TTC described above.

Thereafter, the vehicle control apparatus 100 can determine a level of the probability of the potential collision, at steps S231 to S233, and perform a vehicle control operation corresponding to a level of the probability of the potential collision, at steps S241 to S244. In this case, the level of the probability of the potential collision may become higher as a time at which the vehicle modeling and the moving target modeling meet becomes shorter in the method of determining the probability of the potential collision using the modeling described above. However, embodiments of the present disclosure are not limited thereto.

Specifically, in a situation where a level of the probability of the potential collision is a first level (Level 1), i.e., Yes at step S231, the vehicle control apparatus 100 can perform a driver warning control to alert and/or warn a driver, at step S241; in a situation where a level of the probability of the potential collision is a second level (Level 2), i.e., Yes at step S232, the vehicle control apparatus 100 can perform an external warning control to warn the driver and to alert and/or warn the moving target, at step S242; in a situation where a level of the probability of the potential collision is a third level (Level 3), i.e., Yes at step S233, the vehicle control apparatus 100 can perform a deceleration control to warn to the driver and to decelerate a speed of the vehicle, at step S243; and in a situation where a level of the probability of the potential collision is a fourth level (Level 4), i.e., No at step S233, the vehicle control apparatus 100 can perform a forced braking control to warn the driver and to forcibly brake the vehicle, at step S244.

As shown in FIG. 6, although the level of the probability of the potential collision has been discussed as being divided into four levels, this is merely one example; therefore, embodiments of the preset disclosure are not limited thereto. For example, the level of the probability of the potential collision may be divided into levels more than or less than four levels. depending on a design method of a designer. Further, the control operation shown in FIG. 6 is merely one example; therefore, embodiments of the preset disclosure are not limited thereto.

As described above, the vehicle control apparatus 100 according to aspects of the present disclosure can provide an effect of safely preventing an accident by performing control operations in divided stages according to the probability of a potential collision.

As described above, in a situation where a recognized first moving target is recognized again after having been covered by a structure or the like, it is desired to rapidly control the vehicle. Hereinafter, embodiments in which a moving target is covered by one or more structures will be described, and detailed control methods therefor will be described.

Figure 7:
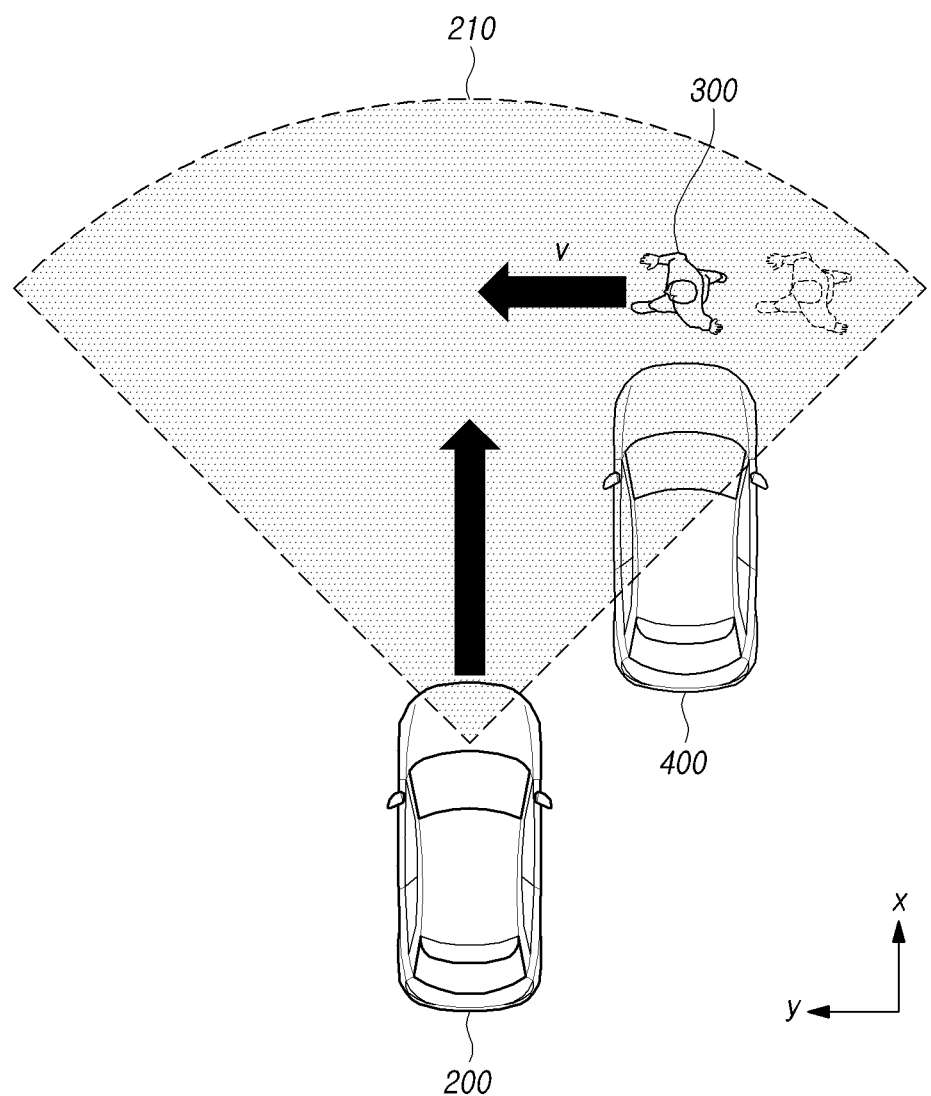
FIG. 7 illustrates a situation where a moving target is not recognized in the vehicle control apparatus and/or the vehicle control system according to aspects of the present disclosure.

FIG. 7 illustrates a situation where a moving target is not recognized in the vehicle control apparatus and/or the vehicle control system according to aspects of the present disclosure.

Figure 8:
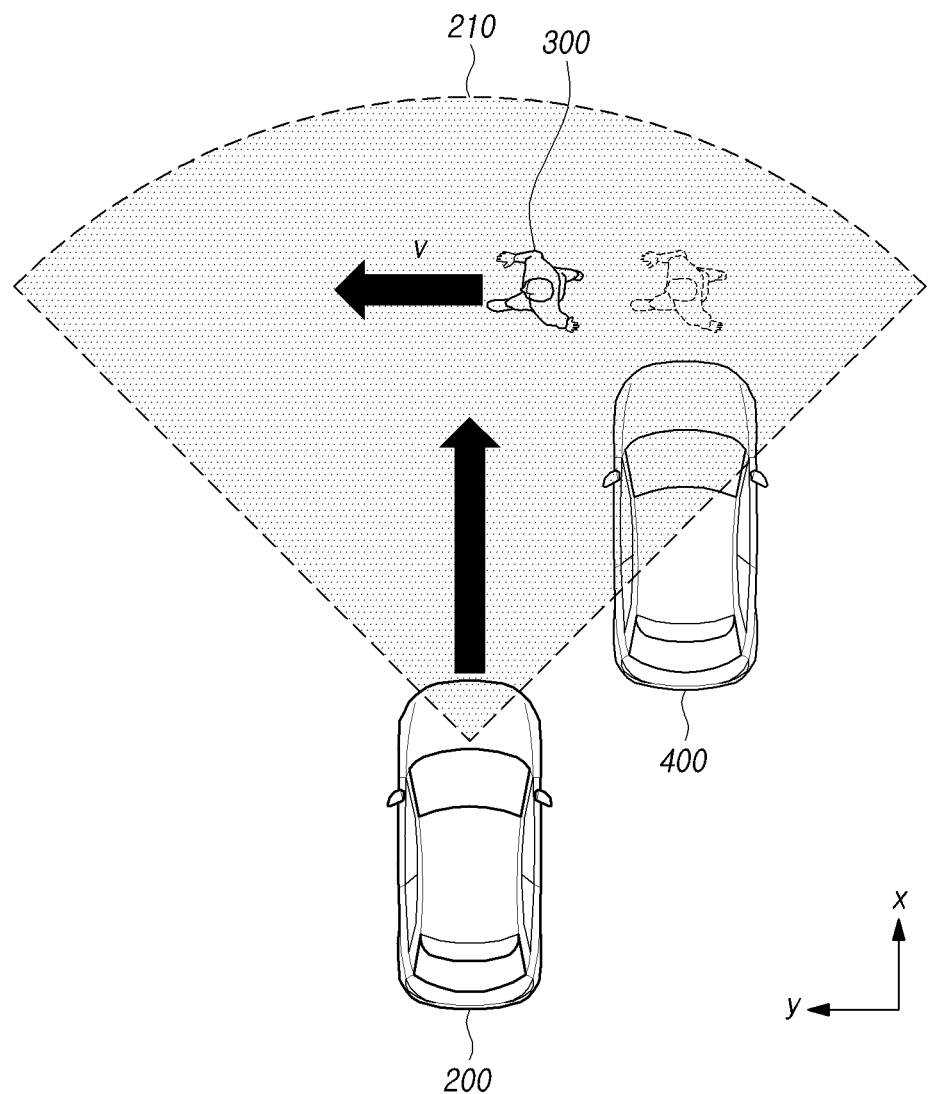
FIG. 8 illustrates a situation where the unrecognized moving target is recognized again in the vehicle control apparatus and/or the vehicle control system according to aspects of the present disclosure.

FIG. 8 illustrates a situation where the unrecognized moving target is recognized again in the vehicle control apparatus and/or the vehicle control system according to aspects of the present disclosure.

Referring to FIG. 7, as described above with reference to FIGS. 3 and 4, in a situation where a vehicle travels in a specific direction (e.g., the x direction), a first target 300 present in a detection area 210 of the first sensor 10, for example, a pedestrian may move in a direction (e.g., the y direction) orthogonal to a traveling direction (e.g., the x direction) of the vehicle. In this case, the vehicle control apparatus 100 can recognize the first target 300, i.e., the pedestrian.

In this situation, if a second target 400 present in the detection area 210 of the first sensor 10, for example, another vehicle is present as shown in FIG. 7, the first target 300, i.e., the pedestrian, may be covered by the second target 400, i.e., the another vehicle, and the vehicle control device 100 cannot recognize the previously recognized first target 300, i.e., the pedestrian.

Referring to FIG. 8, in a situation where the first target 300, i.e., the pedestrian, passes by the second target 400, i.e., the another vehicle, the vehicle control apparatus 100 can recognize again the first target 300, i.e., the pedestrian.

In a case where in the conventional AEB function is employed, since the vehicle control apparatus 100 performs a collision avoidance control computation again on the first target 300 recognized again, i.e., the pedestrian, a timing at which the vehicle is controlled may be delayed.

Therefore, as described above with reference to FIGS. 1 and 2, the vehicle control apparatus 100 according to aspects of the present disclosure can determine whether a moving target is identical, and if the identification is acknowledged, rapidly control the vehicle using the collision avoidance control computation previously calculated.

Hereinafter, embodiments of determining identity between moving targets according to embodiments of the present disclosure will be described in detail.

Figure 9:
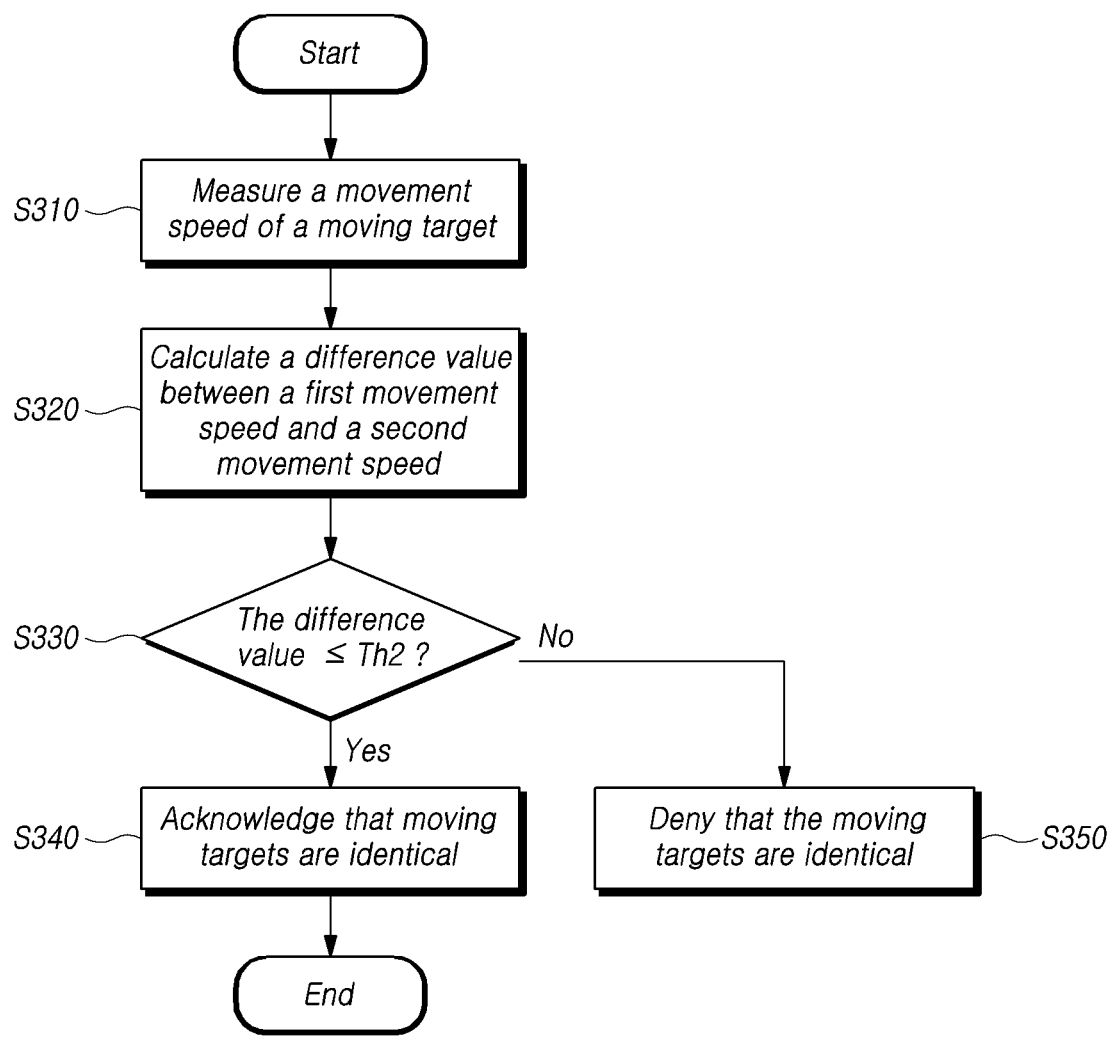
FIG. 9 is a flow chart illustrating embodiments of determining identity between moving targets in the vehicle control apparatus and/or the vehicle control system according to aspects of the present disclosure.

FIG. 9 is a flow chart illustrating embodiments of determining identity between moving targets in the vehicle control apparatus and/or the vehicle control system according to aspects of the present disclosure.

Referring to FIG. 9, the vehicle control apparatus 100 according to aspects of the present disclosure can measure a movement speed of a recognized movement target, at step S310. Specifically, the vehicle control apparatus 100 can measure a first movement speed of a first moving target previously recognized and measure a second movement speed of a second moving target recognized after the first moving target has been unrecognized.

The movement speed of the moving target may refer to, for example, a movement speed in a direction (e.g., the y direction) orthogonal to a traveling direction (e.g., the x direction) of the vehicle described above with reference to FIGS. 3, 4, 7 and 8, and may be acquired by the radar 12 included in the first sensor 10.

In one embodiment, the first sensor 10 may include the radar 12, and the identity determiner 120 can measure movement speeds of the targets in a direction orthogonal to the traveling direction of the vehicle, and determine whether the first moving target and the second moving target are identical based on the first movement speed of the first moving target in the direction orthogonal to the traveling direction of the vehicle and the second movement speed of the second moving target in the direction orthogonal to the traveling direction of the vehicle.

Thereafter, the vehicle control apparatus 100 can calculate a difference value between the first movement speed and the second movement speed, at step S320, determine whether the difference value is equal to or smaller than a preset reference difference value Th2, at step S330, and if the difference value is smaller than or equal to the reference difference value Th2, i.e., Yes at step S330, acknowledge that the first moving target and the second moving target are identical, at step S340.

For example, the identity determiner 120 can determine whether a difference value between the first movement speed and the second movement speed is equal to or smaller than the preset reference difference value Th2, and if the difference value smaller than or equal to the reference difference value Th2, acknowledge that the first moving target and the second moving target are identical.

If the difference value is greater than the reference difference value Th2, i.e., No at step S330, the vehicle control apparatus 100 can deny that the first moving target and the second moving target are identical, at step S350, and as described above, newly perform a collision avoidance control computation on the second moving target and control the vehicle based on the newly performed collision avoidance control computation.

Figure 10:
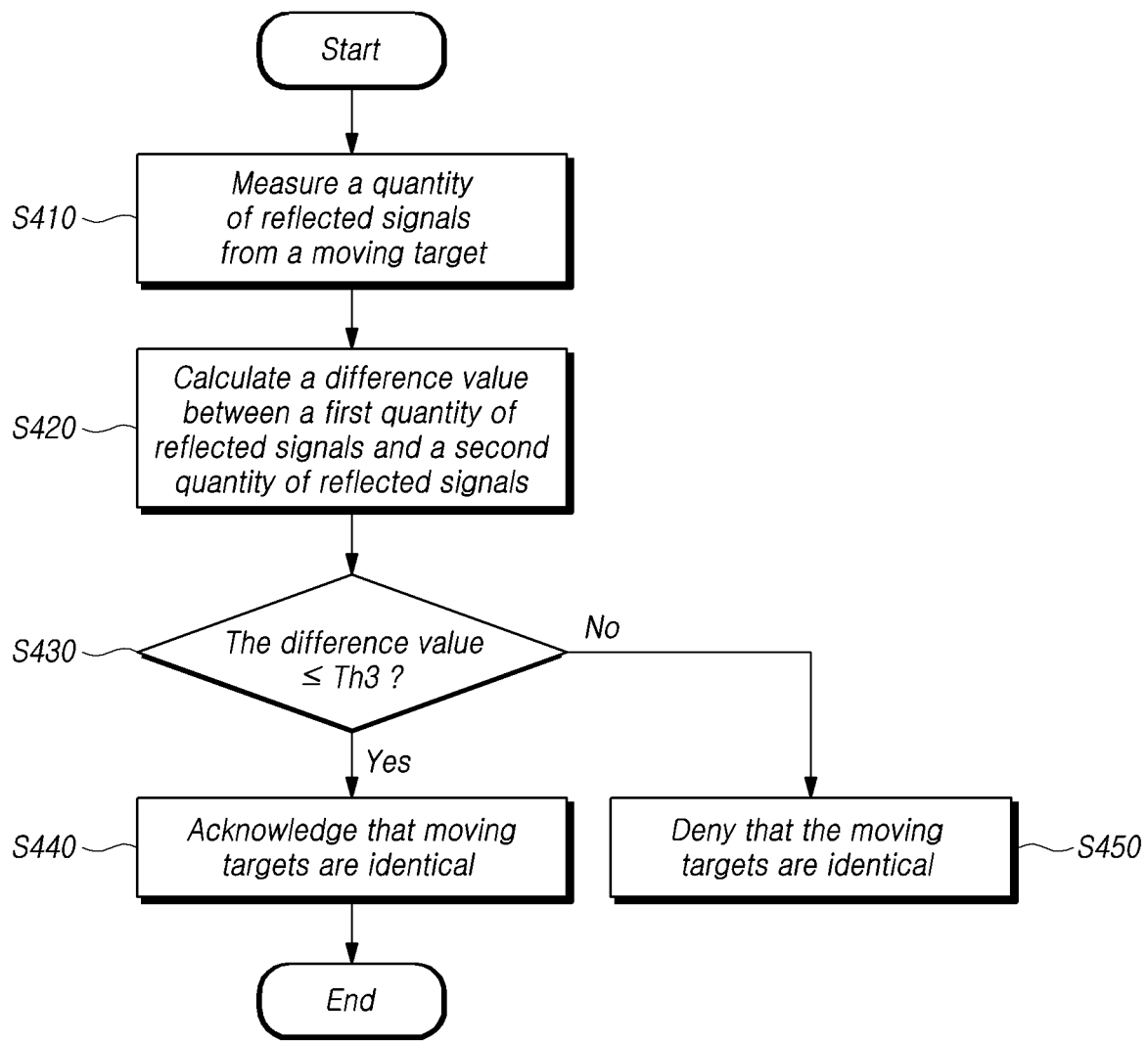
FIG. 10 is a flow chart illustrating embodiments of determining identity between moving targets in the vehicle control apparatus and/or the vehicle control system according to aspects of the present disclosure.

FIG. 10 is a flow chart illustrating embodiments of determining identity between moving targets in the vehicle control apparatus and/or the vehicle control system according to aspects of the present disclosure.

Referring to FIG. 10, the vehicle control apparatus 100 according to aspects of the present disclosure can measure a quantity of reflected signals of a recognized movement target, at step S410. Specifically, the vehicle control apparatus 100 can measure a first quantity of reflected signals from a first moving target previously recognized and measure a second quantity of reflected signals from a second moving target recognized after the first moving target has been unrecognized.

Here, the quantity of reflected signals from the moving targets may be acquired by the radar 12 included in the first sensor 10, and may be expressed as dbsm, a radar cross-section (RCS) indicating a reflection area, or the like. However, embodiments of the present disclosure are not limited thereto.

In one embodiments, the first sensor 10 may include the radar 12, and the identity determiner 120 can measure quantities of reflected signals from the targets after having been transmitted from the radar 12, and determine whether the first moving target and the second moving target are identical based on the first quantity of reflected signals from the first moving target and the second quantity of reflected signals from the second moving target.

Thereafter, the vehicle control apparatus 100 can calculate a difference value between the first quantity of reflected signals and the second quantity of reflected signals, at step S420, determine whether the difference value is equal to or smaller than a preset reference quantity of reflected signals Th3, at step S430, and if the difference value is equal to or smaller than the preset reference quantity of reflected signals Th3, i.e., Yes at step S430, acknowledge that the first moving target and the second moving target are identical, at step S440.

For example, if the difference value between the first quantity of reflected signals and the second quantity of reflected signals is equal to or smaller than the preset reference quantity of reflected signals Th3, the identity determiner 120 can acknowledge that the first moving target and the second moving target are identical.

If the difference value is greater than the reference difference value Th3, i.e., No at step S430, the vehicle control apparatus 100 can deny that the first moving target and the second moving target are identical, at step S450, and as described above, newly perform a collision avoidance control computation on the second moving target and control the vehicle based on the newly performed collision avoidance control computation.

Figure 11:
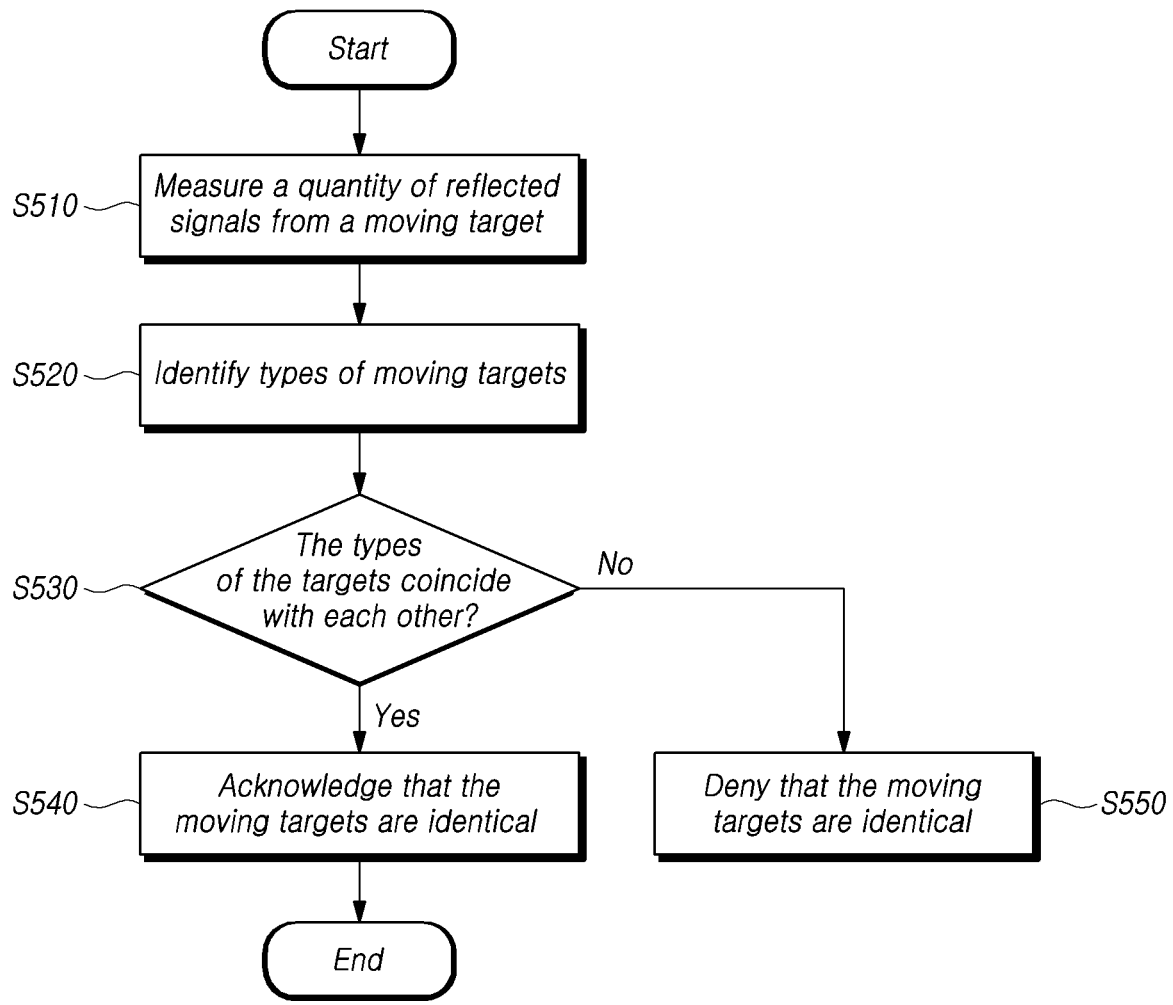
FIG. 11 is a flow chart illustrating embodiments of determining identity between moving targets in the vehicle control apparatus and/or the vehicle control system according to aspects of the present disclosure.

FIG. 11 is a flow chart illustrating embodiments of determining identity between moving targets in the vehicle control apparatus and/or the vehicle control system according to aspects of the present disclosure.

Referring to FIG. 11, the vehicle control apparatus 100 according to aspects of the present disclosure can measure quantities of reflected signals from recognized moving targets, at step S510, identify a type of the target corresponding to the measured quantities of reflected signals based on a table of preset quantities of reflected signals, and determine whether a type of the first moving target and a type of the second moving target are identical, at step S520.

Here, the table may refer to a table in which quantities of reflected signals measured differently according to types of targets are recorded. Such a table may be predetermined and stored based on experiments, design data, and the like, and for example, may be defined as shown in Table 1 below.

TABLE 1

|  | dbsm | Selected maximum distance m | Selected area $m^2$ |
|---|---|---|---|
| Pedestrian | −5 | 60 | 0.316 |
| Cyclist | 0 | 80 | 1 |
| Motorbike | 5 | 100 | 3.16 |
| Passenger Car | 10 | 160 | 10 |

Referring to Table 1, a quantity of reflected signals from the pedestrian is −5 dbsm; a quantity of reflected signals from the bicycle is 0 dbsm; a quantity of reflected signals from the motorcycle is 5 dbsm; and a quantity of reflected signals from the car (a passenger car) is 10 dbsm. However, this is merely one example; therefore, embodiments of the present disclosure are not limited thereto. For example, the identity determiner 120 can preset a table in which quantities of reflected signals are determined differently according to types of targets, and then identify a type of a target corresponding to a first quantity of reflected signals and a type of a target corresponding to a second quantity of reflected signals using the table.

If the types of targets coincide with each other, i.e., Yes at step S530, the vehicle control apparatus 100 can acknowledge that these targets are identical, at step S540. Otherwise, i.e., No at step S530, the vehicle control apparatus 100 can deny that the targets are identical, at step S550.

As described above, the vehicle control apparatus 100 according to aspects of the present disclosure can provide an effect of rapidly controlling the vehicle by identifying whether the targets are identical using a movement speed, a quantity of reflected signals, and the like acquirable by the radar 12.

The embodiments described above with reference to FIGS. 9 to 11 may be applied in a case where the first sensor 10 includes the radar 12. Hereinafter, embodiments applicable in a case where the first sensor 10 includes an image sensor such as the camera 11, the lidar 13, and/or the like will be described below.

Figure 12:
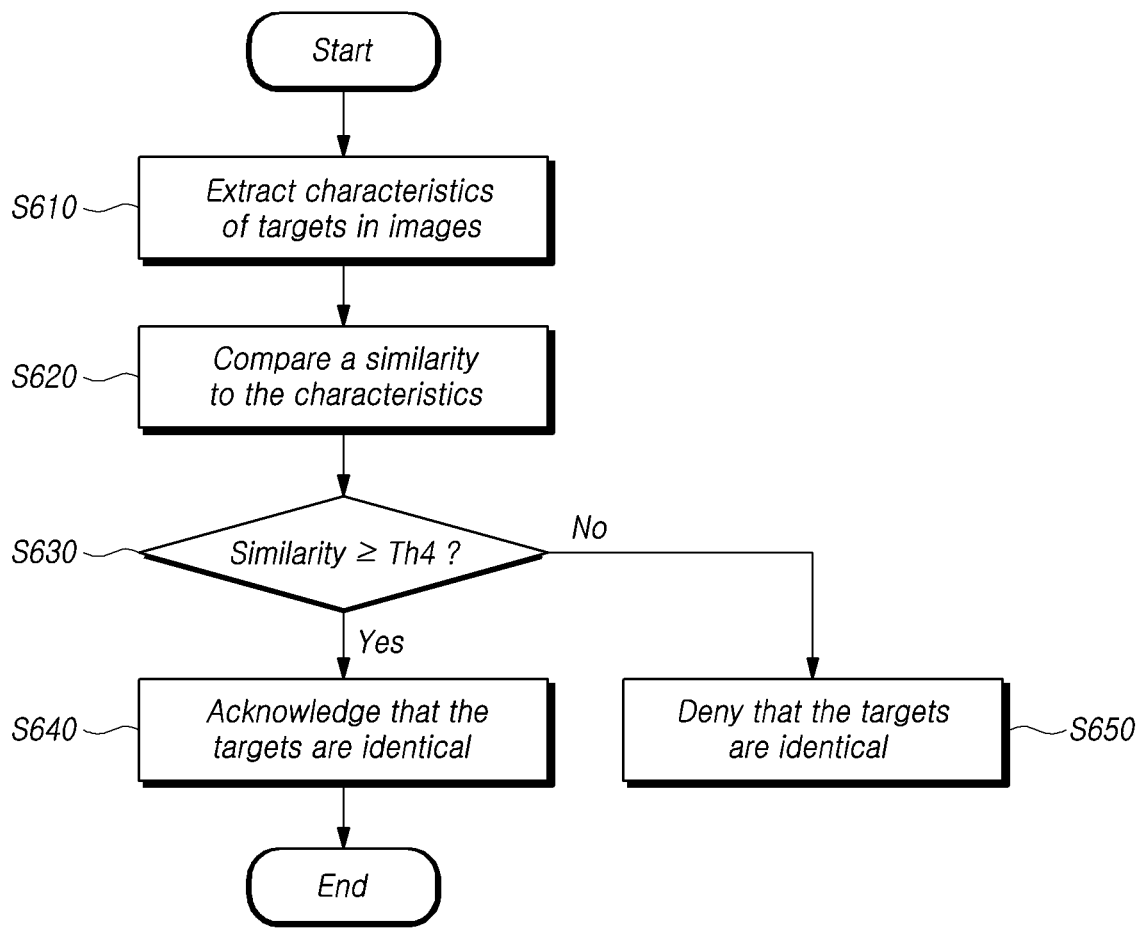
FIG. 12 is a flow chart illustrating embodiments of determining identity between moving targets in the vehicle control apparatus and/or the vehicle control system according to aspects of the present disclosure.

FIG. 12 is a flow chart illustrating embodiments of determining identity between moving targets in the vehicle control apparatus and/or the vehicle control system according to aspects of the present disclosure.

Referring to FIG. 12, the vehicle control apparatus 100 according to aspects of the present disclosure can extract detection information from the first sensor 10 including an image sensor, for example, one or more characteristics of one or more targets from one or more images, at step S610, and compare a similarity to the characteristics of the targets, at step S620.

Here, the characteristic of the targets may refer to visual characteristics obtainable from the images. For example, the characteristics of the target may include at least one of a movement speed of the target, an area of the target, an appearance of the target, and a gaze of the target. However, embodiments of the present disclosure are not limited thereto.

In one embodiment, the first sensor 10 may include an image sensor, and the identity determiner 120 can extract characteristics of targets from images obtained by the image sensor and determine identity between the targets based on the similarity of the characteristics.

Thereafter, the vehicle control apparatus 100 can compare the similarity of the characteristics with a preset reference similarity Th4, and determine whether the similarity of the characteristics is equal to or greater than the reference similarity Th4, at step S630.

If the similarity of the characteristics is equal to or greater than the reference similarity Th4, i.e., YES at step s630, the vehicle control apparatus 100 can acknowledge identity between the targets, at step S640. Otherwise, i.e., No at step S630, the vehicle control apparatus 100 can deny the identity between the targets, at step S650.

As described above, the vehicle control apparatus 100 according to aspects of the present disclosure can provide an effect of rapidly controlling the vehicle and preventing an erroneous control by determining identity between moving targets using characteristics of the targets acquirable by the image sensor.

Although not shown, according to embodiments of the present disclosure, identity between moving targets may be determined according to each of the embodiments shown in FIGS. 9 to 12, and in some embodiments, may also be determined by combining the embodiments shown in FIGS. 9 to 12.

Meanwhile, in a situation a first moving target and a second moving target are identical, identity between the moving targets can be acknowledged, but in some situations, such as determining identity between moving targets using characteristics of the targets according to the embodiments described above with reference to FIGS. 9 to 12, while the first moving target and the second moving target are not identical, identity between the moving targets can be acknowledged in a situation where they are very similar. In this case, the reliability of the determination of identity may be challenged.

Hereinafter, discussions are conducted on embodiments of assessing reliability according to the characteristics of targets used to determine identity between the targets, for example, movement speeds of, and/or quantities of reflected signals from, the moving targets acquired by the radar 12, and/or areas, appearances, gazes, and/or the like of the moving targets acquired by the image sensor.

Figure 13:
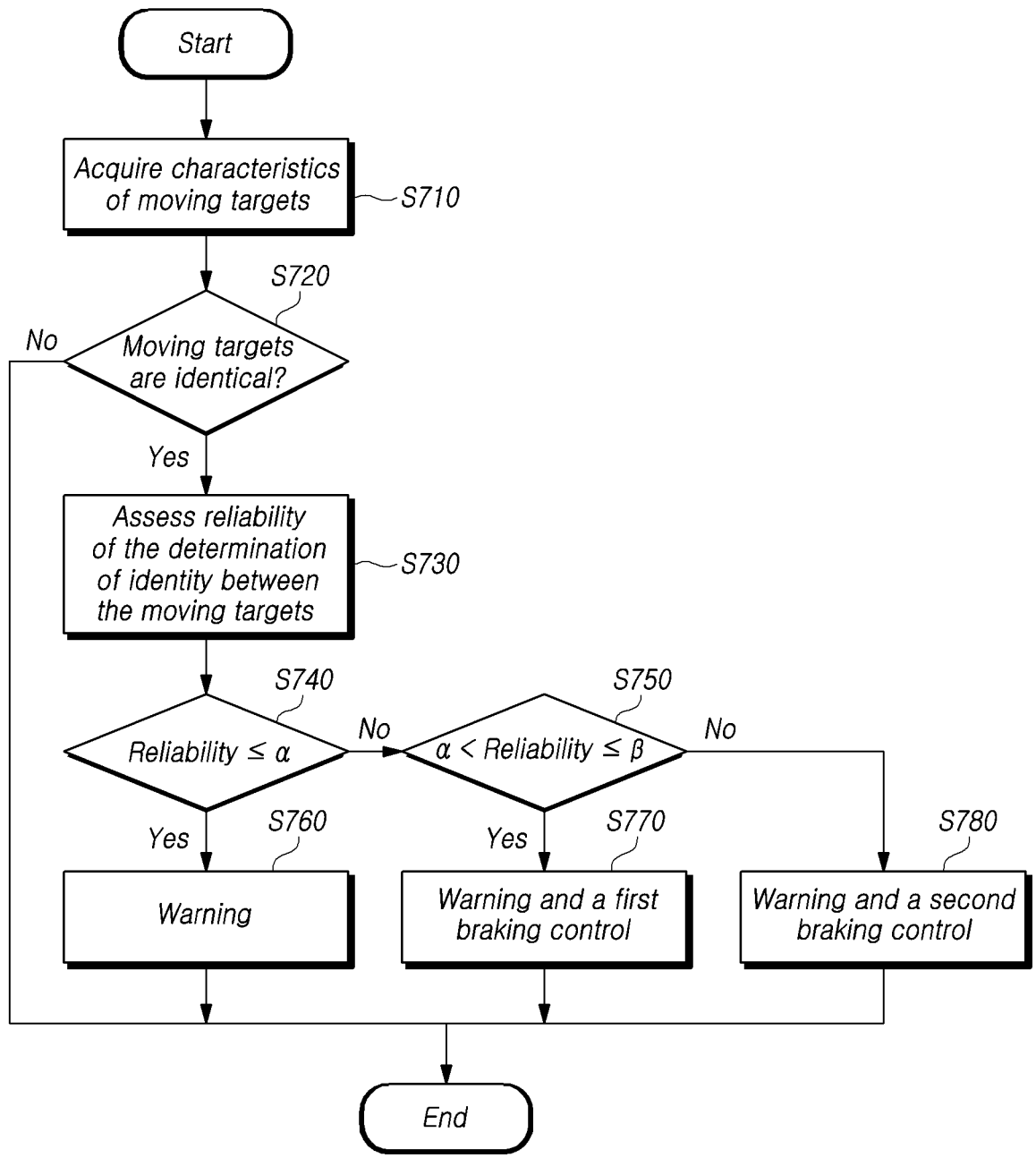
FIG. 13 is a flow chart illustrating embodiments of assessing reliability of an identity determination in the vehicle control apparatus and/or the vehicle control system according to aspects of the present disclosure.

FIG. 13 is a flow chart illustrating embodiments of assessing reliability of an identity determination in the vehicle control apparatus and/or the vehicle control system according to aspects of the present disclosure.

Referring to FIG. 13, the vehicle control apparatus 100 according to aspects of the present disclosure can acquire characteristics of recognized moving targets, at step S710, and determine whether the targets are identical based on the characteristics of the moving targets, at step S720. Here, as described above with reference to FIGS. 9 to 12, the characteristics of the moving targets may include a moving speed, a quantity of reflected signals, an appearance, a gaze (in a case where the moving target is a human), a color, and the like.

Thereafter, the vehicle control apparatus 100 can assess reliability of the determination of identity between the moving targets according to the characteristics of the moving targets used for determining the identity, at step S730.

For example, the identity determiner 120 can assess reliability of the determination of identity between moving targets according to a characteristic of a first moving target and a characteristic of a second moving target used for determining the identity.

In one embodiment, in a case where characteristics of one or more moving targets include both visual information such as an appearance, a color, and/or the like of the moving target, and information based on radar signals such as a quantity of reflected signals, a movement speed, and/or the like, the identity determiner 120 can give the highest level of reliability to such a case. In a case where characteristics of one or more moving targets are related to visual information such as an appearance, a color, and the like of the moving target, the identity determiner 120 can give a medium level of reliability to such a case. In a case where characteristics of one or more moving targets are a quantity of reflected signals, a movement speed, and/or the like of the moving target, the identity determiner 120 can give a relatively low level of reliability to such a case. However, embodiments of the present disclosure are not limited thereto.

The vehicle control apparatus 100 can control the vehicle by reflecting a preset control operation in the collision avoidance control computation according to the given reliability, at steps S740 to S780. For example, the controller 130 can control the vehicle by reflecting a preset control operation according to the reliability to the collision avoidance control computation.

In one embodiment, if the reliability is less than or equal to α, i.e., Yes at step S740, the vehicle control apparatus 100 can perform a warning control to warn a corresponding driver, at step S760.

If the reliability is greater than a and less than or equal to β, i.e., Yes at step S750, the vehicle control apparatus 100 can perform the warning control and a first braking control, at step S770. Here, the first braking control may refer to a control for partially performing the braking of the vehicle.

If the reliability is greater than β, i.e., No at step S750, the vehicle control apparatus 100 can perform the warning control and a second braking control, at step S780. Here, the second braking control may refer to a control in which braking of a higher intensity than that of the first braking control is continuously performed.

As described above, the vehicle control apparatus 100 according to aspects of the present disclosure can provide an effect of giving the reliability of vehicle control to the operator such as a driver by giving the reliability of the identity determination between moving targets according to the characteristics of the moving targets.

Hereinafter, a vehicle control method capable of performing all or some of the embodiments described herein of the present disclosure will be described.

Figure 14:
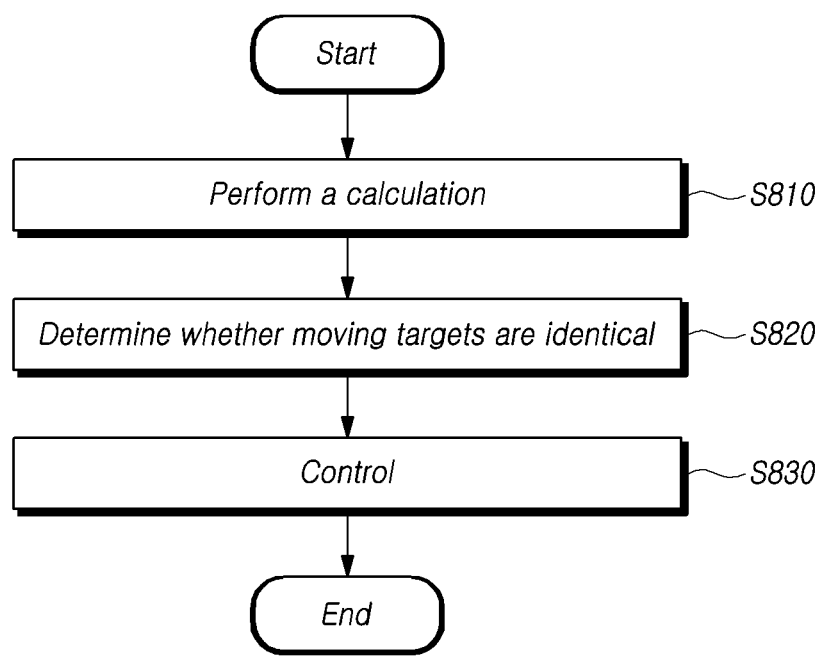
FIG. 14 is a flow chart for illustrating a vehicle control method according to aspects of the present disclosure.

FIG. 14 is a flow chart for illustrating the vehicle control method according to aspects of the present disclosure.

Referring to FIG. 14, a vehicle control method according to aspects of the present disclosure includes: a computation step S810 for recognizing a first moving target based on detection information detected by at least one sensor and performing a collision avoidance control computation based on the probability of a potential collision between the first moving target and an associated vehicle; an identity determination step S820, when the first moving target is not recognized, for recognizing a second moving target based on the detection information acquired after the first moving target is not recognized, and determining whether the first moving target and the second moving target are identical to each other; and a control step S830 for controlling the vehicle based on the collision avoidance control computation when it is acknowledged that the first moving target and the second moving target are identical.

Here, in the computation step S810, a movement speed in a direction orthogonal to a traveling direction of the vehicle with respect to the targets included in the detection information can be measured, and among the targets included in the detection information, a target having a movement speed equal to or greater than a preset reference speed can be determined as the first moving target.

In one embodiment, in a case where the first sensor 10 includes the radar 12, in the identity determination step S820, movement speeds of targets in a direction orthogonal to the traveling direction of the vehicle can be measured, and identity between the moving targets can be determined based on the first movement speed of the first moving target in the direction orthogonal to the traveling direction of the vehicle and the second movement speed of the second moving target in the direction orthogonal to the traveling direction of the vehicle.

In another embodiment, in a case where the first sensor 10 includes the radar 12, in the identity determination step S820, quantities of reflected signals from the targets after having been transmitted from the radar 12 can be measured, and identity between the moving targets can be determined based on the first quantity of reflected signals from the first moving target and the second quantity of reflected signals from the second moving target.

In this situation, if a difference value between the first quantity of reflected signals and the second quantity of reflected signals is equal to or smaller than a preset reference quantity of reflected signals Th3, the identity determiner 120 can acknowledged that the first moving target and the second moving target are identical, at step S820.

In further another embodiment, in the identity determination step S820, a table in which quantities of reflected signals are determined according to types of targets can be preset. Thereafter, a type of a target corresponding to a first quantity of reflected signals and a type of a target corresponding to a second quantity of reflected signals can be identified using the table, and identity between targets can be acknowledged when the types of the targets coincide with each other.

In yet another embodiment, in a case where the first sensor 10 includes an image sensor, in the identity determination step S820, characteristics of targets from images acquired by the image sensor can be extracted, and identity between targets can be determined based on the similarity of the characteristics.

In the identity determination step S820, reliability of the determination of identity between moving targets can assessed according to a characteristic of a first moving target and a characteristic of a second moving target used for determining the identity.

In this case, in the control step S830, the vehicle can be controlled by reflecting a preset control operation in a collision avoidance control computation according to the reliability.

According to the embodiments described herein, it is possible to provide apparatuses and methods of controlling a vehicle for rapidly controlling the vehicle at an appropriate braking time even when a moving target such as a pedestrian, another vehicle, and the like reappears after being covered.

Further, according to the embodiments described herein, it is possible to provide apparatuses and methods of controlling a vehicle for assisting stable driving and convenient driving by minimizing confusion that a driver may experience in a situation where a collision may occur.

The above description and attached drawings have been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present

What is claimed is:

1. A vehicle control device comprising:
   a computing circuitry capable of recognizing a first moving target based on detection information detected by a sensor and performing a collision avoidance control computation based on a probability of a potential collision between the first moving target and an associated vehicle;
   an identity determiner capable of, when the first moving target is not recognized, recognizing a second moving target based on the detection information acquired after the first moving target is not recognized, and determining whether the first moving target and the second moving target are identical to each other; and
   a controller capable of controlling the vehicle by applying an outcome of the collision avoidance control computation of the first moving target to the second moving target when it is acknowledged that the first moving target and the second moving target are identical,
   wherein the sensor includes a radar, and wherein the identity determiner measures quantities of reflected signals from the first and second moving targets after having been transmitted from the radar and determines whether the first moving target and the second moving target are identical based on a first quantity of reflected signals from the first moving target and a second quantity of reflected signals from the second moving target.

2. The vehicle control device according to claim 1, wherein the computing circuitry measures respective movement speeds in a direction orthogonal to a traveling direction of the vehicle with respect to targets included in the detection information, and among the targets included in the detection information, determines a target having a movement speed of the movement speeds that is equal to or greater than a preset reference speed as the first moving target.

3. The vehicle control device according to claim 2, wherein the computing circuitry determines, as the first moving target, a target that is predicted to reach an expected traveling path of the vehicle within a preset reference movement time among the targets moving at the respective movement speeds.

4. The vehicle control device according to claim 1, wherein the computing circuitry calculates a time to collision between the vehicle and at least one target included in the detection information, and determines a target having the time to collision equal to or less than a preset reference collision time as the first moving target.

5. The vehicle control device according to claim 1, wherein the computing circuitry performs the collision avoidance control computation for differently determining at least one of a warning level and a braking level depending on a degree of the probability of the potential collision.

6. The vehicle control device according to claim 1, wherein the sensor includes a radar, and
   wherein the identity determiner measures a movement speed of a target in a direction orthogonal to a traveling direction of the vehicle, and determines whether the first moving target and the second moving target are identical based on a first movement speed of the first moving target in the direction orthogonal to the traveling direction of the vehicle and a second movement speed of the second moving target in the direction orthogonal to the traveling direction of the vehicle.

7. The vehicle control device according to claim 6, wherein when a difference value between the first movement speed and the second movement speed is equal to or smaller than a preset reference difference value, the identity determiner acknowledges that the first moving target and the second moving target are identical.

8. The vehicle control device according to claim 1, wherein when a difference value between the first quantity of reflected signals and the second quantity of reflected signals is equal to or smaller than a preset reference quantity of reflected signals, the identity determiner acknowledges that the first moving target and the second moving target are identical.

9. The vehicle control device according to claim 1, wherein the identity determiner presets a table in which the quantities of reflected signals are determined differently according to types of targets, identifies a type of a target corresponding to the first quantity of reflected signals and a type of a target corresponding to the second quantity of reflected signals using the table, and when the type of the target corresponding to the first quantity of reflected signals and the type of the target corresponding to the second quantity of reflected signals coincide with each other, acknowledges that the first moving target and the second moving target are identical.

10. The vehicle control device according to claim 1, wherein the sensor includes an image sensor, and
    wherein the identity determiner extracts characteristics of targets from images acquired by the image sensor, and determines whether the first moving target and the second moving target are identical based on a similarity of the characteristics.

11. The vehicle control device according to claim 10, wherein the characteristics of the targets include at least one of a movement speed, an area, an appearance, and a gaze.

12. The vehicle control device according to claim 1, wherein the identity determiner assesses reliability of the determination on whether the first moving target and the second moving target are identical according to a characteristic of the first moving target and a characteristic of the second moving target used for determining whether the first moving target and the second moving target are identical, and wherein the controller controls the vehicle by reflecting a preset control operation in the collision avoidance control computation according to the reliability.

13. A vehicle control method comprising:

a computation step of recognizing a first moving target based on detection information detected by a sensor and performing a collision avoidance control computation based on a probability of a potential collision between the first moving target and an associated vehicle;

an identity determination step, when the first moving target is not recognized, of recognizing a second moving target based on the detection information acquired after the first moving target is not recognized, and determining whether the first moving target and the second moving target are identical to each other; and a control step of controlling the vehicle by applying an outcome of the collision avoidance control computation of the first moving target to the second moving target when it is acknowledged that the first moving target and the second moving target are identical, wherein the sensor includes a radar, and wherein, in the identity determination step. quantities of reflected signals from the first and second moving targets. after having been transmitted from the radar, are measured, and whether the first moving target and the second moving target are identical is determined based on a first quantity of reflected signals from the first moving target and a second quantity of reflected signals from the second moving target.

14. The vehicle control method according to claim 13, wherein in the computation step, respective movement speeds in a direction orthogonal to a traveling direction of the vehicle with respect to targets included in the detection information are measured, and among the targets included in the detection information, a target having a movement speed of the movement speeds that is equal to or greater than a preset reference speed is determined as the first moving target.

15. The vehicle control method according to claim 13, wherein the sensor includes a radar, and wherein in the identity determination step, a movement speed of a target in a direction orthogonal to a traveling direction of the vehicle is measured, and whether the first moving target and the second moving target are identical is determined based on a first movement speed of the first moving target in the direction orthogonal to the traveling direction of the vehicle and a second movement speed of the second moving target in the direction orthogonal to the traveling direction of the vehicle.

16. The vehicle control method according to claim 13, wherein in the identity determination step, when a difference value between the first quantity of reflected signals and the second quantity of reflected signals is equal to or smaller than a preset reference quantity of reflected signals, it is acknowledged that the first moving target and the second moving target are identical.

17. The vehicle control method according to claim 13, wherein in the identity determination step, a table is preset in which the quantities of reflected signals are determined differently according to types of targets, identifies a type of a target corresponding to the first quantity of reflected signals and a type of a target corresponding to the second quantity of reflected signals using the table, and when the type of the target corresponding to the first quantity of reflected signals and the type of the target corresponding to the second quantity of reflected signals coincide with each other, it is acknowledged that the first moving target and the second moving target are identical.

18. The vehicle control method according to claim 13, wherein in the identity determination step, reliability of the determination on whether the first moving target and the second moving target are identical is assessed according to a characteristic of the first moving target and a characteristic of the second moving target used for determining whether the first moving target and the second moving target are identical, and wherein in the control step, the vehicle is controlled by reflecting a preset control operation in the collision avoidance control computation according to the reliability.

* * * * *